United States Patent
Ohki

(10) Patent No.: US 9,682,650 B2
(45) Date of Patent: Jun. 20, 2017

(54) DIRECTION INDICATOR SYSTEM AND DIRECTION INDICATOR DEVICE FOR A VEHICLE

(71) Applicant: SHINDENGEN ELECTRIC MANUFACTURING CO., LTD., Tokyo (JP)

(72) Inventor: Isao Ohki, Hanno (JP)

(73) Assignee: Shindengen Electric Manufacturing Co., Ltd., Tokyo (JP)

( * ) Notice: Subject to any disclaimer, the term of this patent is extended or adjusted under 35 U.S.C. 154(b) by 1 day.

(21) Appl. No.: 14/784,947

(22) PCT Filed: Jan. 14, 2015

(86) PCT No.: PCT/JP2015/050775
§ 371 (c)(1),
(2) Date: Oct. 15, 2015

(87) PCT Pub. No.: WO2016/113857
PCT Pub. Date: Jul. 21, 2016

(65) Prior Publication Data
US 2016/0325673 A1 Nov. 10, 2016

(51) Int. Cl.
*G08B 21/00* (2006.01)
*B60Q 1/46* (2006.01)
*B60Q 1/38* (2006.01)

(52) U.S. Cl.
CPC ........ *B60Q 1/46* (2013.01); *B60Q 1/38* (2013.01)

(58) Field of Classification Search
CPC ........................................ B60Q 1/46
USPC ................................. 340/471, 475
See application file for complete search history.

(56) References Cited

U.S. PATENT DOCUMENTS

2008/0150708 A1* 6/2008 Takeuchi ............... B60Q 1/28
340/426.1

FOREIGN PATENT DOCUMENTS

| JP | 2006-321346 A | 11/2006 |
| JP | 2007-125901 A | 5/2007 |
| JP | 2013-199186 A | 10/2013 |

OTHER PUBLICATIONS

ISR for related PCT/JP2015/050775 mailed on Mar. 31, 2015 and its English translation by Google Translate/OCR by Abode Acrobat Pro.

* cited by examiner

*Primary Examiner* — Jeffery Hofsass
(74) *Attorney, Agent, or Firm* — Ladas & Parry, LLP

(57) ABSTRACT

A direction indicator system 1 includes an ignition switch 3, a hazard switch 4, a direction indicator switch 5, direction indicator lamps 6A, 6B, direction indicator lamps 7A, 7B, and a direction indicator device 2. The direction indicator device 2 detects that the switch 4 is in an ON state via direction indicator lamp connection terminals L-SW, R-SW, performs a hazard operation to blink both the direction indicator lamps 6A, 6B and the direction indicator lamps 7A, 7B by a drive current output from a drive current output terminal LOAD with a blinking period T in a case where the switch 3 is in the ON state when the switch 4 is put into the ON state, and operates with a voltage supplied from a battery connection terminal BAT1 to output the drive current when the switch 3 is put into an OFF state during the hazard operation.

7 Claims, 5 Drawing Sheets

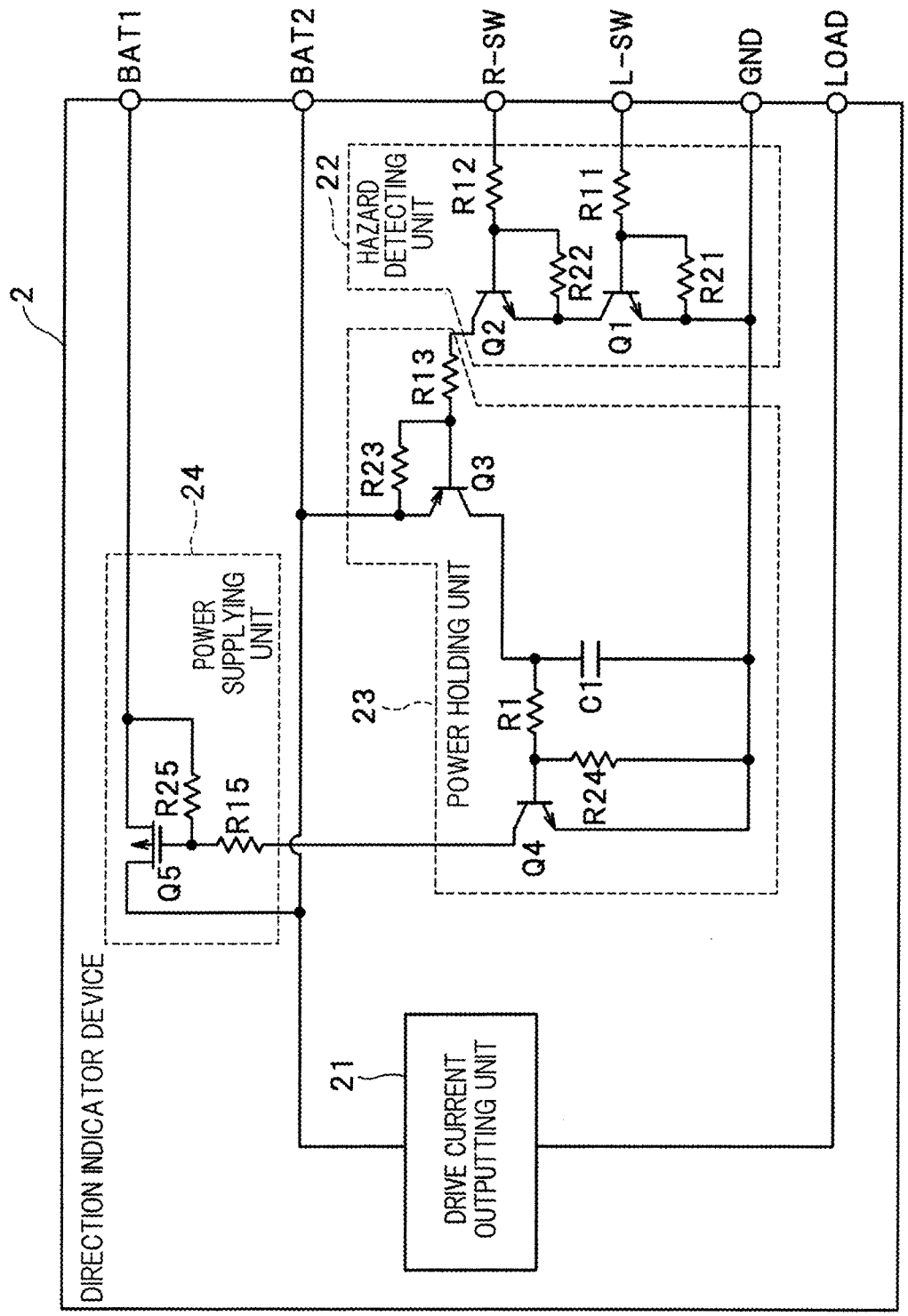
F I G. 2

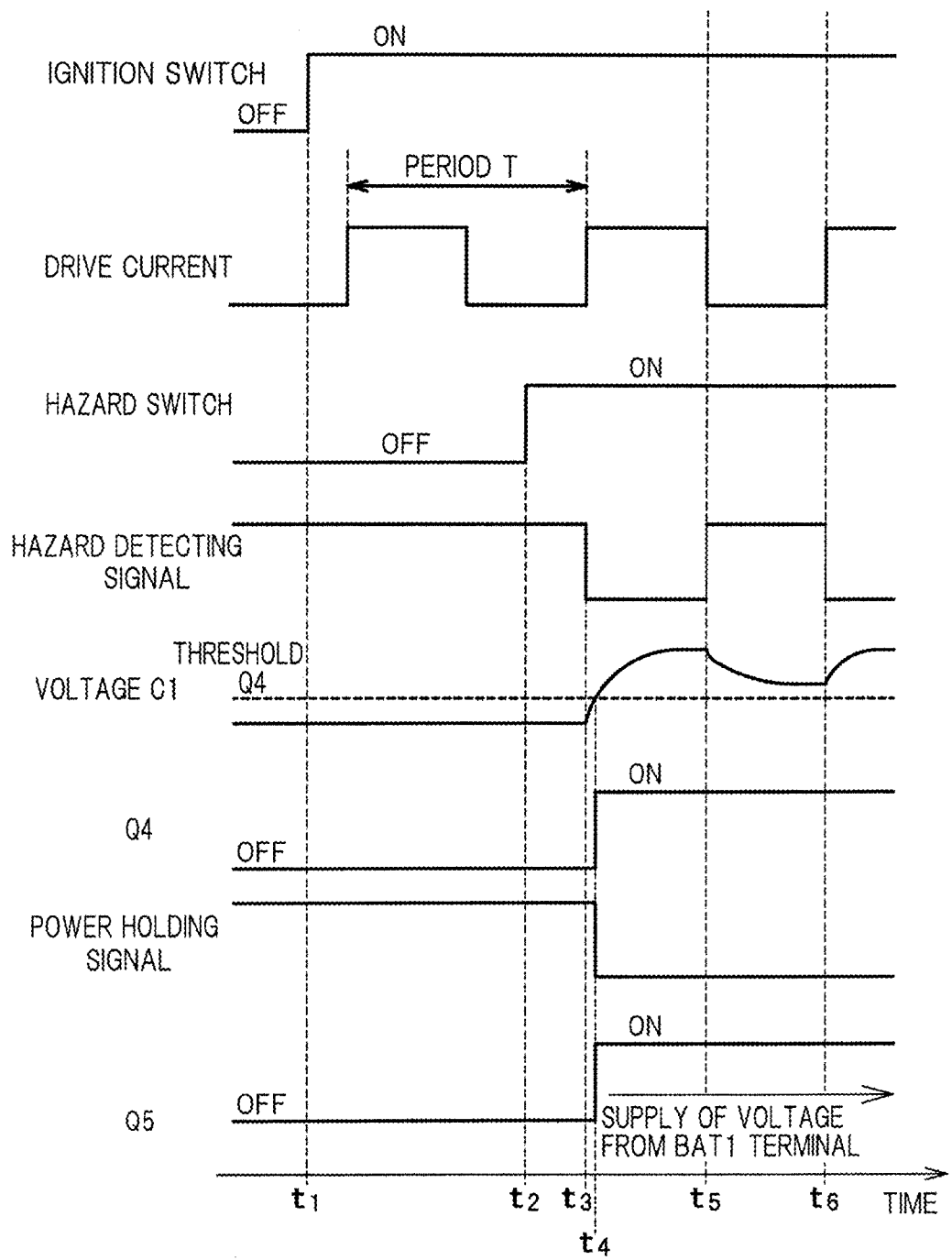
F I G. 3A

DIRECTION INDICATOR SYSTEM AND DIRECTION INDICATOR DEVICE FOR A VEHICLE

CROSS-REFERENCE TO RELATED APPLICATIONS

This application is the U.S. National Stage of International Patent Application No. PCT/JP2015/050775 filed on Jan. 14, 2015, the disclosure of which is hereby incorporated in its entirety by reference.

TECHNICAL FIELD

The present invention relates to a direction indicator system and a direction indicator device.

BACKGROUND ART

A direction indicator system of a vehicle (motorbike, car and the like) includes right and left direction indicator lamps, an ignition switch, a direction indicator switch, a hazard switch, a battery, and a direction indicator device. Of these, the direction indicator device operates with a voltage supplied from a battery to control lighting of the direction indicator lamps depending on a state of the direction indicator switch or hazard switch. For example, the direction indicator device performs a hazard operation to blink both the direction indicator lamp on the left side and the direction indicator lamp on the right side, in a case where the ignition switch is in an ON state when the hazard switch is turned on.

Moreover, the direction indicator device has a hazard maintaining function for maintaining a hazard operation until the hazard switch is turned off even if the ignition switch is turned off during the hazard operation. This hazard maintaining function has been attained using a microcomputer, a logic circuit or the like in the related art.

For example, Patent Literature 1 attains the hazard maintaining function using a current detecting circuit, a maintaining circuit and a blink controlling circuit. The maintaining circuit determines whether or not the hazard operation is in operation on the basis of a current flowing in each direction indicator lamp detected by the current detecting circuit. The blink controlling circuit controls maintaining of a blinking signal on the basis of a determination result by the maintaining circuit. In other words, in a case where the maintaining circuit determines that the hazard operation is in operation, the blink controlling circuit maintains the current for blinking the direction indicator lamps even after the ignition switch is turned off.

CITATION LIST

Patent Literature

Patent Literature 1
Japanese Patent Laid-Open No. 2007-125901

SUMMARY OF INVENTION

Technical Problem

However, in a case where the determination is made using the current flowing in the direction indicator lamps, whether or not the hazard operation is in operation cannot be normally detected in some cases. In order to determine the hazard operation using the current flowing in the direction indicator lamps, as shown in FIG. 4, a determination threshold (hazard detection threshold current) is set to a value between a current value in two lamp-lighting (the direction indicator lamps on the left side or right side are lighted) and a current value in four lamp-lighting (the direction indicator lamps on the left side and right side are lighted). If the detected current is larger than the determination threshold, it is determined that the hazard operation is in operation, and if the current is smaller than the determination threshold, it is determined that a turn signal is lighted (for a right turn or a left turn).

However, in a case where the determination threshold is set to be higher as a determination threshold TH1 in FIG. 4, it cannot be detected that the hazard operation is in operation when a voltage of the battery is low. On the other hand, in a case where the determination threshold is set to be lower as a determination threshold TH2 in FIG. 4, it may be erroneously determined that the hazard operation is in operation when a voltage of the battery is high. Further, in a case where the determination threshold is set at around the midpoint between TH1 and TH2 as a determination threshold TH3 in FIG. 4, it cannot be disadvantageously detected that the hazard operation is in operation when one lamp of the direction indicator lamps is disconnected. Therefore, when the ignition switch is turned off during the hazard operation, the hazard operation may not be probably maintained.

Moreover, in a case where the microcomputer or logic circuit is used, a circuit of the hazard maintaining function may disadvantageously become large scaled and complicated.

The present invention has been made on the basis of technological recognition described above, and has an object to provide a direction indicator device and direction indicator system capable of reliably maintaining the hazard operation when the ignition switch is turned off during the hazard operation.

Solution to Problem

A direction indicator system according to an aspect of the present invention includes an ignition switch that has a first terminal and a second terminal, and is capable of switching between an ON state where the first terminal and the second terminal are electrically connected with each other and an OFF state where the first terminal and the second terminal are electrically disconnected from each other, a hazard switch that has a third terminal, a fourth terminal, and a fifth terminal, and is capable of switching between an ON state where the third terminal, the fourth terminal, and the fifth terminal are electrically connected with each other and an OFF state where the third terminal, the fourth terminal, and the fifth terminal are electrically disconnected from each other, a direction indicator switch that has a sixth terminal, a seventh terminal, and an eighth terminal, and is capable of switching between a state where the sixth terminal and the eighth terminal are electrically connected with each other, a state where the seventh terminal and the eighth terminal are electrically connected with each other, and a state where the sixth terminal, the seventh terminal, and the eighth terminal are electrically disconnected from each other, a first direction indicator lamp that has one end connected with the sixth terminal of the direction indicator switch and another end connected with a ground, the first direction indicator lamp being lighted when a current flows therein;

a second direction indicator lamp that has one end connected with the seventh terminal of the direction indicator switch and another end connected with the ground, the second direction indicator lamp being lighted when a current flows therein, and a direction indicator device that has a first battery connection terminal connected with a positive electrode of a battery, a second battery connection terminal connected via the ignition switch with the positive electrode of the battery, a first direction indicator lamp connection terminal connected with the third terminal of the hazard switch and one end of the first direction indicator lamp, a second direction indicator lamp connection terminal connected with the fourth terminal of the hazard switch and one end of the second direction indicator lamp, and a drive current output terminal connected with the eighth terminal of the direction indicator switch and the fifth terminal of the hazard switch, wherein the direction indicator device detects that the hazard switch is in the ON state via the first and second direction indicator lamp connection terminals, performs a hazard operation to blink both the first and second direction indicator lamps by a drive current output from the drive current output terminal with a blinking period in a case where the ignition switch is in the ON state when the hazard switch is put into the ON state, and operates with a voltage supplied from the first battery connection terminal to output the drive current when the ignition switch is put into the OFF state during the hazard operation.

Further, in the direction indicator system, the direction indicator device includes a drive current outputting unit that outputs the drive current while the voltage of the battery is supplied, a hazard detecting unit that outputs a hazard detecting signal indicating that the hazard switch is in the ON state in a case of detecting the drive current from both the first direction indicator lamp connection terminal and the second direction indicator lamp connection terminal, and a power holding unit that, once receiving the hazard detecting signal, outputs a power holding signal while the hazard switch is in the ON state, and a power supplying unit that, while receiving the power holding signal, supplies the voltage of the battery input from the first battery connection terminal to the drive current outputting unit.

Further, in the direction indicator system, the power holding unit has a capacitor charged by the voltage of the battery while receiving the hazard detecting signal, and outputs the power holding signal on the basis of a voltage of the capacitor.

Further, in the direction indicator system, a holding time on the basis of the capacitor and a resistor connected in series with the capacitor is defined so as to satisfy Formula (1), $$T/2 < \tau \quad (1)$$

where "$\tau$" is the holding time, and "T" is a blinking period for the drive current.

Further, in the direction indicator system, a holding time on the basis of the capacitor and a resistor connected in series with the capacitor is defined so as to satisfy Formula (2), $$\tau < T \quad (2)$$

where "$\tau$" is the holding time, and "T" is a blinking period for the drive current.

Further, in the direction indicator system, the hazard detecting unit has a first switching element having one end connected with a ground terminal and a control terminal connected with the first direction indicator lamp connection terminal, and a second switching element having one end connected with another end of the first switching element and a control terminal connected with the second direction indicator lamp connection terminal, and in a case where the drive current is input to the first and second direction indicator lamp connection terminals when the first and second switching elements are put into a conduction state, the hazard detecting unit outputs an L level signal as the hazard detecting signal from another end of the second switching element, the power holding unit has a third switching element having one end connected with the second battery connection terminal and a control terminal connected with the other end of the second switching element, a capacitor having one end connected with another end of the third switching element and another end thereof connected with the ground terminal, a resistor having one end connected with the one end of the capacitor, and a fourth switching element having one end connected with the ground terminal and a control terminal connected with another end of the resistor, the third switching element is put into the conduction state such that the capacitor is charged by the voltage of the battery when the control terminal of the third switching element receives the L level signal as the hazard detecting signal, and the fourth switching element is put into the conduction state such that the power holding unit outputs the L level signal as the power holding signal from another end of the fourth switching element when the voltage of the capacitor reaches a threshold voltage of the fourth switching element, the power supplying unit has a fifth switching element having one end connected with the first battery connection terminal, another end thereof connected with the drive current outputting unit, and a control terminal connected with the other end of the fourth switching element, and the fifth switching element is put into the conduction state when the control terminal of the fifth switching element receives the L level signal as the power holding signal.

A direction indicator device, according to an aspect of the invention, used for a direction indicator system, the direction indicator system including an ignition switch that has a first terminal and a second terminal, and is capable of switching between an ON state where the first terminal and the second terminal are electrically connected with each other and an OFF state where the first terminal and the second terminal are electrically disconnected from each other, a hazard switch that has a third terminal, a fourth terminal, and a fifth terminal, and is capable of switching between an ON state where the third terminal, the fourth terminal, and the fifth terminal are electrically connected with each other and an OFF state where the third terminal, the fourth terminal, and the fifth terminal are electrically disconnected from each other, a direction indicator switch that has a sixth terminal, a seventh terminal, and an eighth terminal, and is capable of switching between an a state where the sixth terminal and the eighth terminal are electrically connected with each other, a state where the seventh terminal and the eighth terminal are electrically connected with each other, and a state where the sixth terminal, the seventh terminal, and the eighth terminal are electrically disconnected from each other, a first direction indicator lamp that has one end connected with the sixth terminal of the direction indicator switch and another end connected with a ground, the first direction indicator lamp being lighted when a current flows therein, and a second direction indicator lamp that has one end connected with the seventh terminal of the direction indicator switch and another end connected with the ground, the second direction indicator lamp being lighted when a current flows therein, the direction indicator device comprising:

a first battery connection terminal connected with a positive electrode of a battery, a second battery connection terminal connected via the ignition switch with the positive electrode of the battery, a first direction indicator lamp connection terminal connected with the third terminal of the hazard switch and one end of the first direction indicator lamp, a second direction indicator lamp connection terminal connected with the fourth terminal of the hazard switch and one end of the second direction indicator lamp, and a drive current output terminal connected with the eighth terminal of the direction indicator switch and the fifth terminal of the hazard switch, the direction indicator device detects that the hazard switch is in the ON state via the first and second direction indicator lamp connection terminals, performs a hazard operation to blink both the first and second direction indicator lamps by a drive current output from the drive current output terminal with a blinking period in a case where the ignition switch is in the ON state when the hazard switch is put into the ON state, and operates with a voltage supplied from the first battery connection terminal to output the drive current when the ignition switch is put into the OFF state during the hazard operation.

Advantageous Effects of Invention

In a direction indicator system according to the present invention, a direction indicator device includes a first direction indicator lamp connection terminal connected with a third terminal of a hazard switch and one end of a first direction indicator lamp, a second direction indicator lamp connection terminal connected with a fourth terminal of the hazard switch and one end of a second direction indicator lamp, and a drive current output terminal connected with an eighth terminal of a direction indicator switch and a fifth terminal of the hazard switch. The direction indicator device detects that the hazard switch is in an ON state via the first and second direction indicator lamp connection terminals. This allows the direction indicator device to reliably detect that the hazard operation is in operation. Then, when the ignition switch is put into the OFF state during the hazard operation, the direction indicator device operates with a voltage supplied from a first battery connection terminal which is connected with a positive electrode of a battery to output the drive current to the first and second direction indicator lamps. This makes it possible to reliably maintain the hazard operation even if the ignition switch is in the OFF state.

Therefore, according to the present invention, the direction indicator device and the direction indicator system can be provided which are capable of reliably maintaining the hazard operation with an inexpensive and simple circuit when the ignition switch is turned off during the hazard operation.

BRIEF DESCRIPTION OF DRAWINGS

FIG. 2 is a schematic configuration diagram of a direction indicator device 2 according to an embodiment of the invention.

FIG. 3A is a time chart showing an operation example of the direction indicator system 1 according to an embodiment.

DESCRIPTION OF EMBODIMENTS

Hereinafter, a description is given of a direction indicator system and a direction indicator device according to an embodiment of the invention with reference to the drawings. Note that components having the similar function in each figure are designated by the same reference signs and the detailed description of the components having the same reference signs is not repeated.

Figure 1:
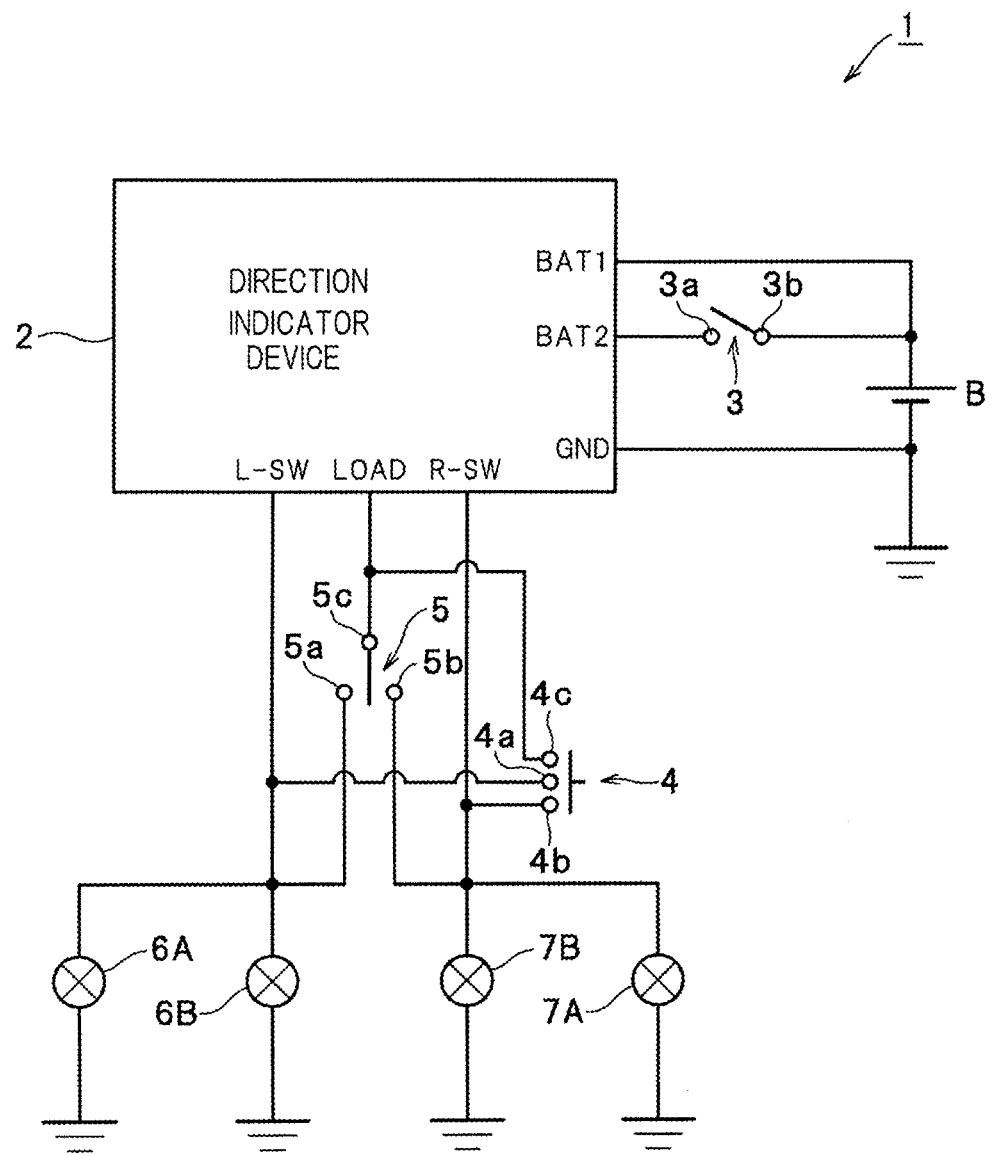
FIG. 1 is a schematic configuration diagram of a direction indicator system 1 according to an embodiment of the invention.

A direction indicator system 1 according to an embodiment includes a direction indicator device 2, an ignition switch 3, a hazard switch 4, a direction indicator switch 5, direction indicator lamps 6A and 6B (first direction indicator lamp), direction indicator lamps 7A and 7B (second direction indicator lamp), and a battery B, as shown in FIG. 1.

The direction indicator device 2 operates with a voltage supplied from the battery B to control lighting of the direction indicator lamps 6A, 6B, 7A, and 7B depending on a state of the hazard switch 4 or the direction indicator switch 5. This direction indicator device 2 has a battery connection terminal BAT1 (first battery connection terminal), a battery connection terminal BAT2 (second battery connection terminal), a ground terminal GND to be grounded, a direction indicator lamp connection terminal L-SW (first direction indicator lamp connection terminal), a direction indicator lamp connection terminal R-SW (second direction indicator lamp connection terminal), a drive current output terminal LOAD that outputs a drive current for blinking the direction indicator lamps 6A, 6B, 7A, and 7B, as shown in FIG. 1.

The battery connection terminals BAT1 and BAT2 connect the direction indicator device 2 with the battery B. More specifically, the battery connection terminal BAT1 is directly connected with a positive electrode of the battery B, and the battery connection terminal BAT2 is connected via the ignition switch 3 with the positive electrode of the battery B. As shown in FIG. 1, the battery connection terminal BAT2 is connected with a terminal 3a of the ignition switch 3 and is connected to the positive electrode of the battery B when the ignition switch 3 is in an ON state.

The direction indicator lamp connection terminal L-SW is a terminal for detecting whether or not the drive current is flowing in the direction indicator lamps 6A and 6B. The direction indicator lamp connection terminal L-SW, as shown in FIG. 1, is connected with a terminal 4a of the hazard switch 4 and one end of each of the direction indicator lamps 6A and 6B.

The direction indicator lamp connection terminal R-SW is a terminal for detecting whether or not the drive current is flowing in the direction indicator lamps 7A and 7B. The direction indicator lamp connection terminal R-SW is connected with a terminal 4b of the hazard switch 4 and one end of each of the direction indicator lamps 7A and 7B.

The drive current output terminal LOAD is a terminal for supplying the drive current to the direction indicator lamps 6A, 6B, 7A, and 7B. The drive current output terminal LOAD is connected with a terminal 5c of the direction indicator switch 5 and a terminal 4c of the hazard switch 4.

If the direction indicator switch 5 electrically connects between a terminal 5a and the terminal 5c, the direction indicator lamps 6A and 6B blink. At this time, the direction indicator lamp connection terminal L-SW receives the drive current which is output from the drive current output terminal LOAD and supplied to the direction indicator lamps 6A and 6B. On the other hand, if the direction indicator switch 5 electrically connects between a terminal 5b and the terminal 5c, the direction indicator lamps 7A and 7B blink. At this time, the direction indicator lamp connection terminal R-SW receives the drive current which is output from the drive current output terminal LOAD and supplied to the direction indicator lamps 7A and 7B.

Further, if the hazard switch 4 is in the ON state (state where the terminal 4a, the terminal 4b and the terminal 4c are electrically connected with each other), the direction indicator lamps 6A and 6B and the direction indicator lamps 7A and 7B blink. At this time, the direction indicator lamp connection terminal L-SW and the direction indicator lamp connection terminal R-SW receive the drive current which is output from the drive current output terminal LOAD and supplied to the direction indicator lamps 6A, 6B, 7A, and 7B.

Next, a description is given of the ignition switch 3, the hazard switch 4 and the direction indicator switch 5.

The ignition switch 3 is a switch for starting/stopping a vehicle driving device such as an engine (not shown). The ignition switch 3 has the terminal 3a (first terminal) and a terminal 3b (second terminal), and is configured to be capable of switching between an ON state where the terminal 3a and the terminal 3b are electrically connected with each other and an OFF state where the terminal 3a and the terminal 3b are electrically disconnected from each other.

The hazard switch 4 is a switch for performing a hazard operation to blink the direction indicator lamps 6A, 6B, 7A, and 7B. The hazard switch 4 has the terminal 4a (third terminal), the terminal 4b (fourth terminal), and the terminal 4c (fifth terminal). The hazard switch 4 is configured to be capable of switching between the ON state where the terminal 4a, the terminal 4b, and the terminal 4c are electrically connected with each other and an OFF state where the terminal 4a, the terminal 4b, and terminal 4c are electrically disconnected from each other.

The direction indicator switch 5 is a switch for indicating a moving direction of a vehicle by blinking the direction indicator lamps 6A and 6B or the direction indicator lamps 7A and 7B. The direction indicator switch 5 has the terminal 5a (sixth terminal), the terminal 5b (seventh terminal), and the terminal 5c (eighth terminal). The direction indicator switch 5 is configured to be capable of switching between a state where the terminal 5a and the terminal 5c are electrically connected with each other, a state where the terminal 5b and the terminal 5c are electrically connected with each other, and a state where the terminal 5a, the terminal 5b, and the terminal 5c are electrically disconnected from each other.

Next, a description is given of the direction indicator lamps 6A, 6B, 7A, and 7B. The direction indicator lamps 6A and 6B are attached onto the left side of the vehicle (not shown) and the direction indicator lamps 7A and 7B are attached to the right side of the vehicle. Further, the direction indicator lamps 6A and 7A are attached to the front of the vehicle and the direction indicator lamps 6B and 7B are attached to the rear of the vehicle. Note that the direction indicator lamps 6A, 6B, 7A, and 7B each may be a light bulb or may be an LED lamp including a plurality of LED elements.

The direction indicator lamps 6A and 6B are connected in parallel with each other, as shown in FIG. 1. Each of the direction indicator lamps 6A and 6B has one end connected with the terminal 5a of the direction indicator switch 5 and the other end connected with the ground to be lighted when a current flows therein. Similarly, the direction indicator lamps 7A and 7B are connected in parallel with each other. Each of the direction indicator lamps 7A and 7B has one end connected with the terminal 5b of the direction indicator switch 5 and the other end connected to the ground to be lighted when the current flows therein.

The above direction indicator device 2 performs the hazard operation to blink both the direction indicator lamps 6A and 6B and the direction indicator lamps 7A and 7B by the drive current output from the drive current output terminal LOAD with a blinking period T, in a case where the ignition switch 3 is in the ON state when the hazard switch 4 is put into the ON state.

The direction indicator device 2 detects that the hazard switch 4 is in the ON state (that is, in a state where the hazard switch 4 is pressed down) via the direction indicator lamp connection terminal L-SW and the direction indicator lamp connection terminal R-SW. This allows the direction indicator device 2 to reliably detect that the hazard operation is in operation. Then, when the ignition switch 3 is put into the OFF state during the hazard operation, the direction indicator device 2 operates with a voltage supplied from the battery connection terminal BAT1 to output the drive current to the direction indicator lamps 6A, 6B, 7A, and 7B. This allows the hazard operation to be reliably maintained even if the ignition switch 3 is in the OFF state.

Next, a description is given in detail of an internal configuration of the direction indicator device 2 with reference to FIG. 2.

The direction indicator device 2 includes a drive current outputting unit 21, a hazard detecting unit 22, a power holding unit 23, and a power supplying unit 24, as shown in FIG. 2.

The drive current outputting unit 21 outputs the drive current for blinking the direction indicator lamp while the voltage of the battery B is supplied. The voltage of the battery B is supplied via the battery connection terminal BAT2 to the drive current outputting unit 21. Note that when the ignition switch 3 is turned off during the hazard operation (that is, in a state where the hazard operation is maintained), the voltage of the battery B is supplied via the battery connection terminal BAT1 to the drive current outputting unit 21, which is described in detail later.

The hazard detecting unit 22, in a case of detecting the drive current from both the direction indicator lamp connection terminal L-SW and the direction indicator lamp connection terminal R-SW, outputs a hazard detecting signal indicating that the hazard switch 4 is in the ON state.

A description is given of a configuration example of the hazard detecting unit 22. The hazard detecting unit 22 includes a switching element Q1 (first switching element), and a switching element Q2 (second switching element), as shown in FIG. 2. Each of the switching elements Q1 and Q2 is, for example, an NPN-type bipolar transistor.

Note that, as shown in FIG. 2, resistors R11, R12, R21, and R22 may be provided in order to stabilize operations of the switching elements Q1 and Q2. The resistor R11 and the resistor R12 are provided to base terminals of the switching element Q1 and the switching element Q2, respectively. The resistor R21 is provided between the base terminal and emitter terminal of the switching element Q1, and the resistor R22 is provided between the base terminal and emitter terminal of the switching element Q2.

Moreover, the switching elements Q1 and Q2 may not be limited to the bipolar transistor, but may be other switching elements (e.g., field-effect transistor).

The switching element Q1 and the switching element Q2 are connected in series with each other. A control terminal (base terminal) of the switching element Q1 is connected with the direction indicator lamp connection terminal L-SW and a control terminal (base terminal) of the switching element Q2 is connected with the direction indicator lamp connection terminal R-SW. In other words, the switching element Q1 has one end (emitter terminal) connected with the ground terminal GND and the control terminal connected with the direction indicator lamp connection terminal L-SW. The switching element Q2 has one end (emitter terminal) connected with the other end (collector terminal) of the switching element Q1 and the control terminal connected with the direction indicator lamp connection terminal R-SW.

When the hazard switch 4 is turned on so that the drive current is input to the direction indicator lamp connection terminal L-SW and the direction indicator lamp connection terminal R-SW, the switching element Q1 and the switching element Q2 are put into a conduction state. This causes the hazard detecting unit 22 to output an L level signal as the hazard detecting signal from the other end (collector terminal) of the switching element Q2.

Once receiving the hazard detecting signal, the power holding unit 23 outputs a power holding signal while the hazard switch 4 is in the ON state.

A description is given of a configuration example of the power holding unit 23. The power holding unit 23 includes a switching element Q3 (third switching element), a capacitor C1, a resistor R1 connected in series with the capacitor C1, and a switching element Q4 (fourth switching element), as shown in FIG. 2. The switching element Q3 is, for example, a PNP-type bipolar transistor and the switching element Q4 is, for example, an NPN-type bipolar transistor.

Note that, as shown in FIG. 2, resistors R13, R23, and R24 may be provided in order to stabilize an operation of the switching element Q4. The resistor R13 is provided to a base terminal of the switching element Q3. The resistor R23 is provided between the base terminal and emitter terminal of the switching element Q3, and the resistor R24 is provided between a base terminal and emitter terminal of the switching element Q4.

Moreover, the switching elements Q3 and Q4 may not be limited to the bipolar transistor, but may be other switching elements (e.g., field-effect transistor).

The switching element Q3 has one end (emitter terminal) connected with the battery connection terminal BAT2, a control terminal (base terminal) connected with other end of the switching element Q2, and the other end thereof (collector terminal) connected with the capacitor C1.

The capacitor C1 has one end connected with the other end (collector terminal) of the switching element Q3, and the other end thereof connected with the ground terminal GND, as shown in FIG. 2. The resistor R1 has one end connected with one end of the capacitor C1 and the other end thereof connected with the control terminal of the switching element Q4.

The switching element Q4 has one end (emitter terminal) connected with the ground terminal GND and the control terminal (base terminal) connected with the other end of the resistor R1. Further, the other end (collector terminal) of the switching element Q4 as an output terminal of the power holding unit 23 is connected with the power supplying unit 24.

When the control terminal of the switching element Q3 receives the hazard detecting signal (L level signal) from the hazard detecting unit 22, the switching element Q3 is put into the conduction state such that the capacitor C1 is charged by the voltage of the battery B. Then, when the voltage of the capacitor C1 reaches a threshold voltage of the switching element Q4, the switching element Q4 is put into the conduction state. This causes the power holding unit 23 to output the L level signal as the power holding signal from the other end (collector terminal) of the switching element Q4.

As described above, the power holding unit 23, which includes the capacitor C1 charged by the voltage of the battery B while receiving the hazard detecting signal, is configured to output the power holding signal on the basis of the voltage of the capacitor C1.

The power supplying unit 24, while receiving the power holding signal output by the power holding unit 23, supplies the voltage of the battery B input from the battery connection terminal BAT1 to the drive current outputting unit 21.

A description is given of a configuration example of the power supplying unit 24. The power supplying unit 24 includes a switching element Q5 (fifth switching element) as shown in FIG. 2. The switching element Q5 is, for example, a P-type MOSFET.

Note that, as shown in FIG. 2, resistors R15 and R25 may be provided in order to stabilize an operation of the switching element Q5. The resistor R15 is provided to a gate terminal of the switching element Q5, and the resistor R25 is provided between the gate terminal and source terminal of the switching element Q5.

Moreover, the switching elements Q5 may not be limited to the field-effect transistor, but may be other switching elements (e.g., bipolar transistor).

The switching element Q5 has one end (source terminal) connected with the battery connection terminal BAT1, the other end thereof (drain terminal) connected with the drive current outputting unit 21, and a control terminal (gate terminal) connected with the other end (collector terminal) of the switching element Q4, as shown in FIG. 2. When the control terminal of the switching element Q5 receives the power holding signal (L level signal), the switching element Q5 is put into the conduction state. This allows the voltage of the battery B to be supplied via the battery connection terminal BAT1 to the drive current outputting unit 21.

As described above, according to the embodiment, the direction indicator device 2 can be constituted by simple and inexpensive circuits without using a complex and expensive logic circuit or microcomputer.

Figure 3B:
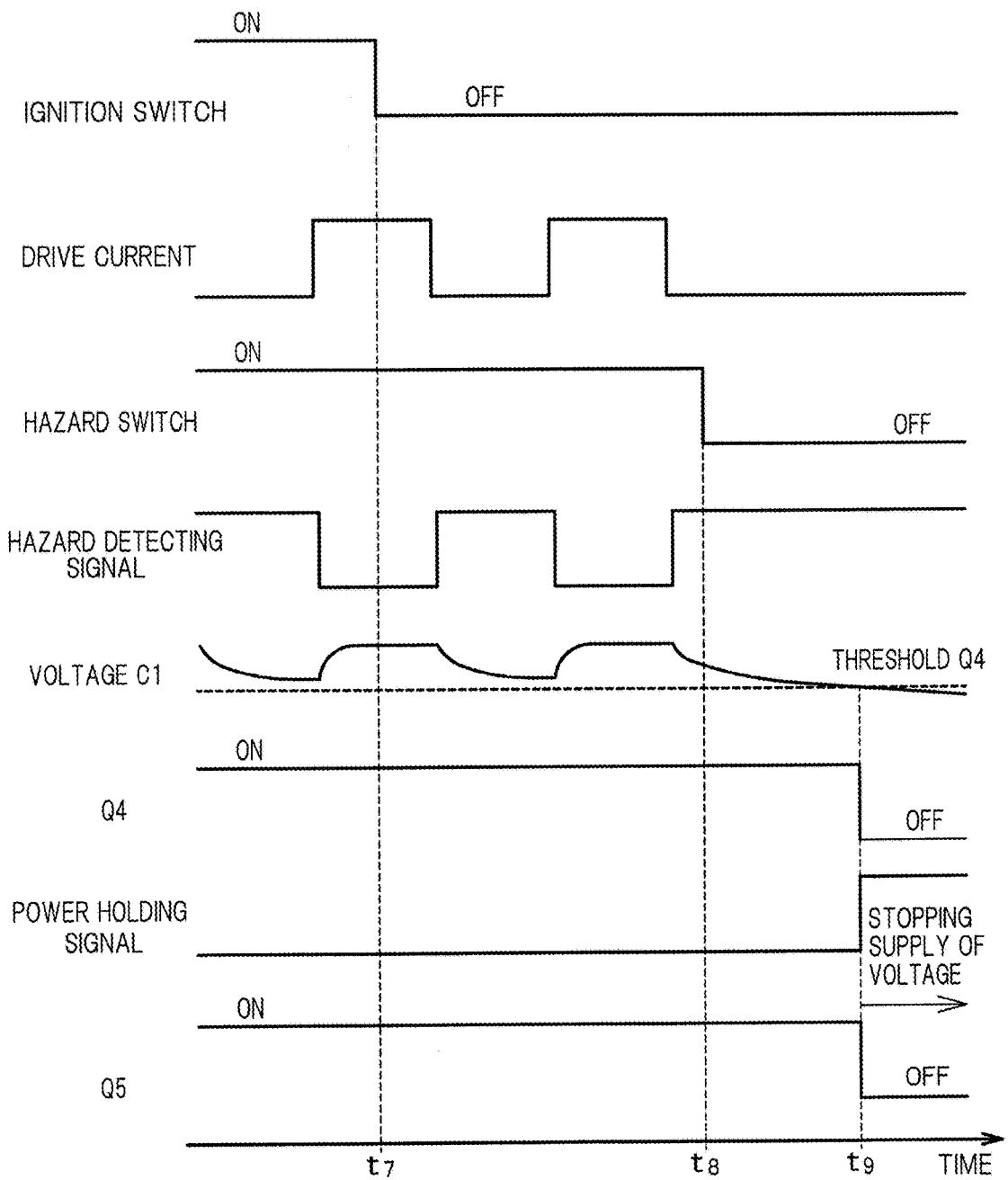
FIG. 3B is a time chart showing an operation example of the direction indicator system 1 according to an embodiment following FIG. 3A.
Figure 4:
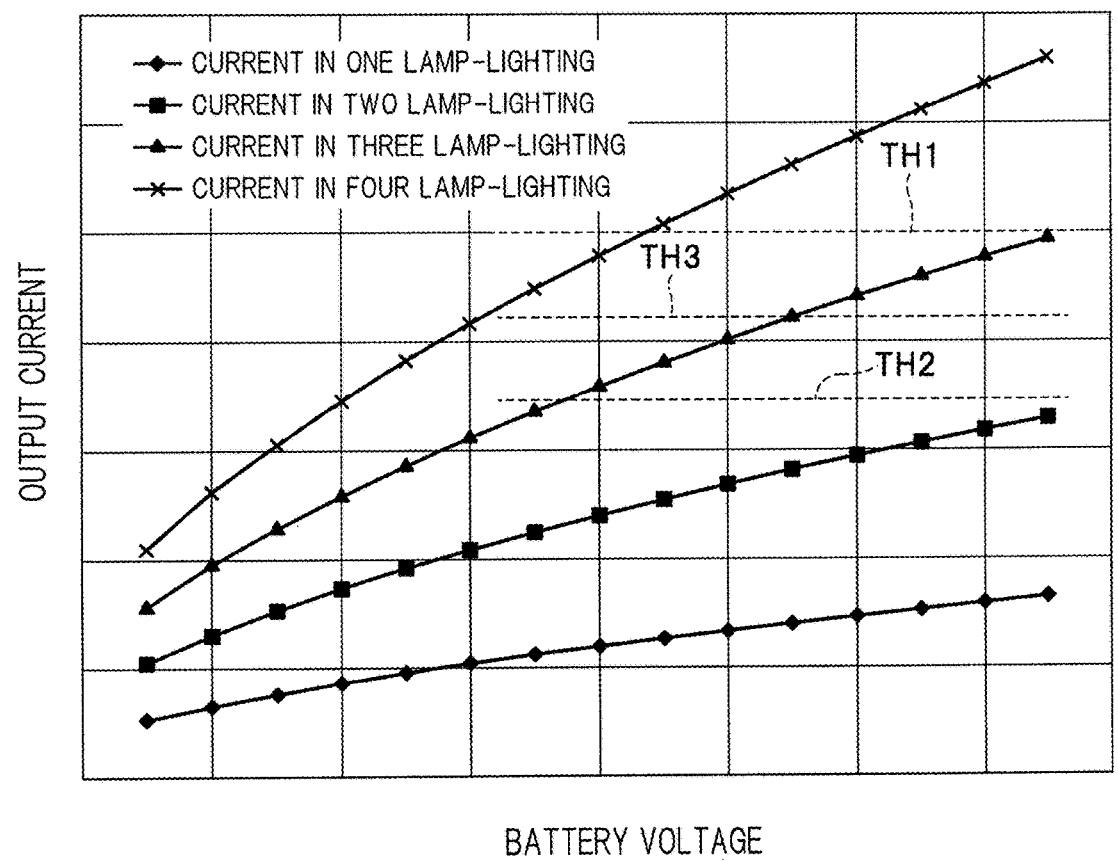
FIG. 4 is a graph for illustrating a problem in a case where determination is made on whether or not the hazard operation is in operation on the basis of the current flowing in a direction indicator lamp.

Next, a description is given of an operation of the direction indicator device 2 with reference to time charts in FIG. 3A and FIG. 3B.

First, the ignition switch 3 is put into the ON state at a time $t_1$. This causes the voltage of the battery B input from the battery connection terminal BAT2 to be supplied to drive the current outputting unit 21 such that the drive current outputting unit 21 outputs the drive current. This drive current is, for example, a rectangular wave having a period T, as shown in FIG. 3A.

After that, the hazard switch 4 is pressed down to be put into the ON state at a time $t_2$. This causes the hazard detecting unit 22 to detect the drive current from both the direction indicator lamp connection terminal L-SW and the direction indicator lamp connection terminal R-SW and output the hazard detecting signal (L level signal). As shown in FIG. 3A, since the hazard detecting signal synchronizes with the drive current, the hazard detecting signal is output at a time $t_3$.

When the power holding unit 23 receives the hazard detecting signal so as to put the switching element Q3 into the conduction state, the capacitor C1 is charged by the voltage of the battery B input from the battery connection terminal BAT2. Then, the voltage of the capacitor C1 reaches the threshold voltage of the switching element Q4 at a time $t_4$. This causes the switching element Q4 to be put into the conduction state such that the power holding signal (L level signal) is output from the power holding unit 23. The switching element Q5, when receiving the power holding signal, is put into the conduction state. As a result of this, the voltage of the battery B is supplied to the drive current outputting unit 21 not only from the battery connection terminal BAT2 but also from the battery connection terminal BAT1.

After that, since the drive current falls to the L level at a time $t_5$, the hazard detecting unit 22 stops outputting the hazard detecting signal. For this reason, the switching element Q3 is put into an insulating state to stop charging the capacitor C1. Electric charge accumulated in the capacitor C1 is discharged through the resistor R1 from the ground terminal GND. Therefore, the voltage of the capacitor C1 gradually decreases for a time period from the time $t_5$ to a time $t_6$ (when the drive current rises to an H level), as shown in FIG. 3A.

Here, in terms of maintenance of the hazard operation, the power holding unit 23 preferably continues to output the power holding signal for the time period from the time $t_5$ to time $t_6$. In other words, the voltage of the capacitor C1 preferably does not fall below the threshold of the switching element Q4 during this time period. More specifically, a holding time T on the basis of the capacitor C1 and resistor R1 may be defined so as to satisfy Formula (1). The holding time is a time period from when the hazard switch 4 is turned off until the power holding unit 23 stops outputting the power holding signal (i.e., until the output from the power holding unit 23 rises to the H level). That is, in FIG. 3B, the holding time is a time period from a time $t_8$ to time $t_9$.

$$T/2 < \tau \tag{1}$$

Here, "τ" is a holding time, and "T" is a blinking period for a drive current. This allows the power holding unit 23 to output the power holding signal even while the hazard detecting signal is not output, and thereby to continue the supply of voltage via the battery connection terminal BAT1.

After that, the ignition switch 3 is put into the OFF state at a time $t_7$, as shown in FIG. 3B. This causes the supply of voltage via the battery connection terminal BAT2 to be stopped, but the supply of voltage via the battery connection terminal BAT1 is continued. For this reason, the drive current outputting unit 21 continues to output the drive current, maintaining the hazard operation.

After that, the hazard switch 4 is put into the OFF state at the time $t_8$. This causes the hazard detecting unit 22 to not detect the drive current from at least any one of the direction indicator lamp connection terminal L-SW and the direction indicator lamp connection terminal R-SW, and thus, stop outputting the hazard detecting signal. Note that, even if the hazard switch 4 is in the OFF state, in a case where the direction indicator switch 5 electrically connects between the terminal 5a and the terminal 5c or between the terminal 5b and the terminal 5c (that is, in a case where a direction of right or left is indicated by the direction indicator switch 5), the hazard detecting unit 22 detects the drive current from the direction indicator lamp connection terminals L-SW or R-SW. In this case, however, the hazard detecting unit 22 does not output the hazard detecting signal, as is understood from the above configuration.

Since the hazard detecting unit 22 does not output the hazard detecting signal, the switching element Q3 is put into the insulating state and the electric charge accumulated in the capacitor C1 is discharged, reducing the voltage of the capacitor C1. Then, the voltage of the capacitor C1 falls to the threshold voltage of the switching element Q4 at a time $t_9$, putting the switching element Q4 into the insulating state. For this reason, the power holding unit 23 stops outputting the power holding signal, and the switching element Q5 of the power supplying unit 24 is put into the insulating state. As a result of this, the supply of voltage to the drive current outputting unit 21 is stopped, which causes the drive current not to be output, stopping the hazard operation.

Note that the holding time τ on the basis of the capacitor C1 and resistor R1 may be defined so as to satisfy Formula (2) in order to quickly stop the hazard operation.

$$\tau < T \tag{2}$$

Here, "τ" is a holding time, and "T" is a blinking period for a drive current.

As described above, in the direction indicator system 1 according to the embodiment, the direction indicator device 2 includes the direction indicator lamp connection terminal L-SW which is connected with the terminal 4a of the hazard switch 4 and one end of each of the direction indicator lamps 6A and 6B, direction indicator lamp connection terminal R-SW which is connected with the terminal 4b of the hazard switch 4 and one end of each of the direction indicator lamps 7A and 7B, and the drive current output terminal LOAD which is connected with the terminal 5c of the direction indicator switch 5 and the terminal 4c of the hazard switch 4. Therefore, the direction indicator device 2 detects that the hazard switch 4 is in the ON state via the direction indicator lamp connection terminal L-SW and the direction indicator lamp connection terminal R-SW. This allows the direction indicator device 2 to reliably detect that the hazard operation is in operation. Then, when the ignition switch 3 is put into the OFF state during the hazard operation, the direction indicator device 2 operates with a voltage supplied from the battery connection terminal BAT1 which is connected with the positive electrode of the battery to output the drive current to the direction indicator lamps 6A, 6B, 7A, and 7B. This allows the hazard operation to be reliably maintained even if the ignition switch 3 is in the OFF state.

Those skilled in the art may conceive additional effects or various modifications of the present invention on the basis of the above description, but aspects of the present invention are not limited to the individual embodiments described above. The components across the different embodiments may be adequately combined. Various additions, modifications and partial deletions may be made within a scope not departing from conceptual ideas and the gist of the present invention which are derived from content and its equivalent defined in the claims.

REFERENCE SIGNS LIST 1 direction indicator system
2 direction indicator device
21 drive current outputting unit 22 hazard detecting unit
23 power holding unit
24 power supplying unit
3 ignition switch
3a, 3b terminal
4 hazard switch,
4a, 4b, 4c terminal
5 direction indicator switch
5a, 5b, 5c terminal
6A, 6B, 7A, 7B direction indicator lamp
B battery
BAT1, BAT2 battery connection terminal
C1 capacitor
GND ground terminal
L-SW, R-SW direction indicator lamp connection terminal
LOAD drive current output terminal
Q1 to Q5 switching element
R11, R12, R13, R15, R1 resistor
R21, R22, R23, R24, R25 resistor
TH1 to TH3 determination threshold

The invention claimed is:

1. A direction indicator system comprising:
an ignition switch that has a first terminal and a second terminal, and is capable of switching between an ON state where the first terminal and the second terminal are electrically connected with each other and an OFF state where the first terminal and the second terminal are electrically disconnected from each other;
a hazard switch that has a third terminal, a fourth terminal, and a fifth terminal, and is capable of switching between an ON state where the third terminal, the fourth terminal, and the fifth terminal are electrically connected with each other and an OFF state where the third terminal, the fourth terminal, and the fifth terminal are electrically disconnected from each other;
a direction indicator switch that has a sixth terminal, a seventh terminal, and an eighth terminal, and is capable of switching between a state where the sixth terminal and the eighth terminal are electrically connected with each other, a state where the seventh terminal and the eighth terminal are electrically connected with each other, and a state where the sixth terminal, the seventh terminal, and the eighth terminal are electrically disconnected from each other;
a first direction indicator lamp that has one end connected with the sixth terminal of the direction indicator switch and another end connected with a ground, the first direction indicator lamp being lighted when a current flows therein;
a second direction indicator lamp that has one end connected with the seventh terminal of the direction indicator switch and another end connected with the ground, the second direction indicator lamp being lighted when a current flows therein; and
a direction indicator device that has a first battery connection terminal connected with a positive electrode of a battery, a second battery connection terminal connected via the ignition switch with the positive electrode of the battery, a first direction indicator lamp connection terminal connected with the third terminal of the hazard switch and one end of the first direction indicator lamp, a second direction indicator lamp connection terminal connected with the fourth terminal of the hazard switch and one end of the second direction indicator lamp, and a drive current output terminal connected with the eighth terminal of the direction indicator switch and the fifth terminal of the hazard switch,
wherein the direction indicator device detects that the hazard switch is in the ON state via the first and second direction indicator lamp connection terminals, performs a hazard operation to blink both the first and second direction indicator lamps by a drive current output from the drive current output terminal with a blinking period in a case where the ignition switch is in the ON state when the hazard switch is put into the ON state, and operates with a voltage supplied from the first battery connection terminal to output the drive current when the ignition switch is put into the OFF state during the hazard operation.

2. The direction indicator system according to claim 1, wherein
the direction indicator device includes
a drive current outputting unit that outputs the drive current while the voltage of the battery is supplied,
a hazard detecting unit that outputs a hazard detecting signal indicating that the hazard switch is in the ON state in a case of detecting the drive current from both the first direction indicator lamp connection terminal and the second direction indicator lamp connection terminal, and
a power holding unit that, once receiving the hazard detecting signal, outputs a power holding signal while the hazard switch is in the ON state, and
a power supplying unit that, while receiving the power holding signal, supplies the voltage of the battery input from the first battery connection terminal to the drive current outputting unit.

3. The direction indicator system according to claim 2, wherein
the power holding unit has a capacitor charged by the voltage of the battery while receiving the hazard detecting signal, and outputs the power holding signal on the basis of a voltage of the capacitor.

4. The direction indicator system according to claim 3, wherein
a holding time on the basis of the capacitor and a resistor connected in series with the capacitor is defined so as to satisfy Formula (1), $$T/2 < \tau \tag{1}$$

where "$\tau$" is the holding time, and "T" is a blinking period for the drive current.

5. The direction indicator system according to claim 3, wherein
a holding time on the basis of the capacitor and a resistor connected in series with the capacitor is defined so as to satisfy Formula (2), $$\tau < T \tag{2}$$

where "$\tau$" is the holding time, and "T" is a blinking period for the drive current.

6. The direction indicator system according to claim 2, wherein
the hazard detecting unit has
a first switching element having one end connected with a ground terminal and a control terminal connected with the first direction indicator lamp connection terminal, and a second switching element having one end connected with another end of the first switching element and a control terminal connected with the second direction indicator lamp connection terminal, and in a case where the drive current is input to the first and second direction indicator lamp connection terminals when the first and second switching elements are put into a conduction state, the hazard detecting unit outputs an L level signal as the hazard detecting signal from another end of the second switching element, the power holding unit has a third switching element having one end connected with the second battery connection terminal and a control terminal connected with the other end of the second switching element, a capacitor having one end connected with another end of the third switching element and another end thereof connected with the ground terminal, a resistor having one end connected with the one end of the capacitor, and a fourth switching element having one end connected with the ground terminal and a control terminal connected with another end of the resistor, the third switching element is put into the conduction state such that the capacitor is charged by the voltage of the battery when the control terminal of the third switching element receives the L level signal as the hazard detecting signal, and the fourth switching element is put into the conduction state such that the power holding unit outputs the L level signal as the power holding signal from another end of the fourth switching element when the voltage of the capacitor reaches a threshold voltage of the fourth switching element, the power supplying unit has a fifth switching element having one end connected with the first battery connection terminal, another end thereof connected with the drive current outputting unit, and a control terminal connected with the other end of the fourth switching element, and the fifth switching element is put into the conduction state when the control terminal of the fifth switching element receives the L level signal as the power holding signal.

7. A direction indicator device used for a direction indicator system, the direction indicator system including an ignition switch that has a first terminal and a second terminal, and is capable of switching between an ON state where the first terminal and the second terminal are electrically connected with each other and an OFF state where the first terminal and the second terminal are electrically disconnected from each other, a hazard switch that has a third terminal, a fourth terminal, and a fifth terminal, and is capable of switching between an ON state where the third terminal, the fourth terminal, and the fifth terminal are electrically connected with each other and an OFF state where the third terminal, the fourth terminal, and the fifth terminal are electrically disconnected from each other, a direction indicator switch that has a sixth terminal, a seventh terminal, and an eighth terminal, and is capable of switching between an a state where the sixth terminal and the eighth terminal are electrically connected with each other, a state where the seventh terminal and the eighth terminal are electrically connected with each other, and a state where the sixth terminal, the seventh terminal, and the eighth terminal are electrically disconnected from each other, a first direction indicator lamp that has one end connected with the sixth terminal of the direction indicator switch and another end connected with a ground, the first direction indicator lamp being lighted when a current flows therein, and a second direction indicator lamp that has one end connected with the seventh terminal of the direction indicator switch and another end connected with the ground, the second direction indicator lamp being lighted when a current flows therein, the direction indicator device comprising:

a first battery connection terminal connected with a positive electrode of a battery, a second battery connection terminal connected via the ignition switch with the positive electrode of the battery, a first direction indicator lamp connection terminal connected with the third terminal of the hazard switch and one end of the first direction indicator lamp, a second direction indicator lamp connection terminal connected with the fourth terminal of the hazard switch and one end of the second direction indicator lamp, and a drive current output terminal connected with the eighth terminal of the direction indicator switch and the fifth terminal of the hazard switch, the direction indicator device detects that the hazard switch is in the ON state via the first and second direction indicator lamp connection terminals, performs a hazard operation to blink both the first and second direction indicator lamps by a drive current output from the drive current output terminal with a blinking period in a case where the ignition switch is in the ON state when the hazard switch is put into the ON state, and operates with a voltage supplied from the first battery connection terminal to output the drive current when the ignition switch is put into the OFF state during the hazard operation.

* * * * *